United States Patent
Nishimura (10) Patent No.: US 9,154,716 B2
(45) Date of Patent: Oct. 6, 2015

(54) IMAGE PROCESSING APPARATUS AND METHOD FOR SMOOTHING PIXEL VALUES ACCORDING TO A DIVERGENCE OF PIXEL CANDIDATES

(71) Applicant: Takeyoshi Nishimura, Yokohama (JP)

(72) Inventor: Takeyoshi Nishimura, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/102,812

(22) Filed: Dec. 11, 2013

(65) Prior Publication Data

US 2014/0168481 A1    Jun. 19, 2014

(30) Foreign Application Priority Data

Dec. 17, 2012    (JP) .................................. 2012-274223

(51) Int. Cl.
*H04N 5/357*    (2011.01)
*H04N 5/225*    (2006.01)

(52) U.S. Cl.
CPC ............. *H04N 5/357* (2013.01); *H04N 5/2254* (2013.01)

(58) Field of Classification Search
CPC ..... H04N 1/4092; H04N 5/3651; H04N 1/58; H04N 1/409; H04N 5/357; H04N 5/2254
USPC ........ 348/241, 606, 224.1, 607, 243; 382/266
See application file for complete search history.

(56) References Cited

U.S. PATENT DOCUMENTS

| | | | |
|---|---|---|---|
| 8,154,629 B2 * | 4/2012 | Kanemitsu et al. | 348/241 |
| 2009/0160992 A1 * | 6/2009 | Inaba et al. | 348/308 |
| 2011/0274350 A1 | 11/2011 | Hara | |
| 2012/0287310 A1 * | 11/2012 | Fujii et al. | 348/239 |

FOREIGN PATENT DOCUMENTS

| | | |
|---|---|---|
| JP | 2008-205737 | 9/2008 |
| JP | 2010-218110 | 9/2010 |
| WO | WO 2008/102677 A1 | 8/2008 |

* cited by examiner

*Primary Examiner* — Nhan T Tran
*Assistant Examiner* — Chan Nguyen
(74) *Attorney, Agent, or Firm* — Oblon, McClelland, Maier & Neustadt, L.L.P.

(57) ABSTRACT

An image processing unit includes a candidate pixel group determiner to specify each pixel of an image to be processed as pixel of interest, extract pixels having divergence in position in a certain range from the pixel of interest, and determine, from the extracted pixels, pixels having divergence in pixel value in a certain range from the pixel of interest as a candidate pixel group, an associator to associate the candidate pixel group with the pixel of interest, and an image processor to perform image processing on the candidate pixel group associated with the pixel of interest. The image processor selects, from the candidate pixel group, pixels having divergence in pixel value in a certain range from the pixel of interest as a pixel group to be processed, and smoothes the pixel value of the pixel of interest in accordance with each pixel value of the candidate pixel group.

8 Claims, 8 Drawing Sheets

| 116 | 134 | 183 | 174 | 183 |
|-----|-----|-----|-----|-----|
| 124 | 114 | 129 | 166 | 190 |
| 113 | 101 | 112 | 168 | 181 |
| 37  | 98  | 121 | 118 | 172 |
| 41  | 32  | 109 | 123 | 168 |

FIG.5B

| 4  | 22 | 71 | 62 | 71 |
|----|----|----|----|----|
| 12 | 2  | 17 | 54 | 78 |
| 1  | 11 | 0  | 56 | 69 |
| 75 | 14 | 9  | 6  | 60 |
| 71 | 80 | 3  | 11 | 56 |

FIG.5C

| 116 | 134 |     |     |     |
|-----|-----|-----|-----|-----|
| 124 | 114 | 129 |     |     |
| 113 | 101 | 112 |     |     |
|     | 98  | 121 | 118 |     |
|     |     | 109 | 123 |     |

REPEAT COUNT: 1

FIG.9B

REPEAT COUNT: N

FIG.9C

REPEAT COUNT: N+1

IMAGE PROCESSING APPARATUS AND METHOD FOR SMOOTHING PIXEL VALUES ACCORDING TO A DIVERGENCE OF PIXEL CANDIDATES

CROSS REFERENCE TO RELATED APPLICATION

The present application is based on and claims priority from Japanese Patent Application No. 2012-274223, filed on Dec. 17, 2012, the disclosure of which is hereby incorporated by reference in its entirety.

BACKGROUND OF THE INVENTION

1. Field of the Invention

The present invention relates to an image processing unit, an image processing method, and an imaging device incorporating the image processing unit.

2. Description of the Related Art

Shot noises or dark current noises occur in an image sensor of a digital camera or an imaging circuit of an imaging device such as a scanner due to its property, and deteriorate image quality. To improve the quality of captured images, image processing is needed to remove or reduce noise components from the images.

An image processing unit performing image processing is comprised of, for example, a circuit to execute filtering with use of a digital filter. Certain frequency components can be reduced by such filtering to remove noise components. However, by simple filtering an important portion of an image such as edges needed for a user to perceive an image may be lost. That is, simple filtering may cause deterioration in image quality.

There is a known filtering with a $\epsilon$-filter which does not deteriorate image quality unlike simple filtering. The $\epsilon$-filter is a filter to determine, as a similar pixel, a pixel whose divergence is equal to or lower than a threshold in an arbitrary filter size. The $\epsilon$-filter can be repeatedly used since a window size can be reduced. Thus, the entire image or an arbitrarily divided image block can be repeatedly subjected to filtering while changing the number of filterings depending on a certain condition such as brightness of a subject, as disclosed in Japanese Patent Application Publication No. 2008-205737, for example.

However, through repeated filterings with the $\epsilon$-filter, the pixels of the edge portion of an image and neighboring pixels of the edge portion become similar. This results in generation of an image with an expanded and blurred edge portion.

SUMMARY OF THE INVENTION

The present invention aims to provide an image processing unit which can reduce noise in an image with an edge portion retained even through repeated filtering at plural times.

According to one embodiment, an image processing unit comprises a candidate pixel group determiner configured to specify each pixel of an image to be processed as a pixel of interest, extract pixels having a divergence in position in a certain range from the pixel of interest, and determine, from the extracted pixels, pixels having a divergence in pixel value in a certain range from the pixel of interest as a candidate pixel group, an associator configured to associate the pixels of the candidate pixel group with the pixel of interest, and an image processor configured to perform image processing on the pixels of the candidate pixel group associated with the pixel of interest, wherein the image processor is configured to select, from the pixels of the candidate pixel group, pixels having a divergence in pixel value in a certain range from the pixel of interest as a pixel group to be processed, and smooth the pixel value of the pixel of interest in accordance with the pixel value of each pixel of the candidate pixel group, the determining of the candidate pixel group determiner is executed for each pixel of interest at once, and the image processing of the image processor is executed for each pixel of interest at a plurality of times.

BRIEF DESCRIPTION OF THE DRAWINGS

Features, embodiments, and advantages of the present invention will become apparent from the following detailed description with reference to the accompanying drawings.

DETAILED DESCRIPTION OF PREFERRED EMBODIMENT

Hereinafter, embodiments of an image processing unit will be described in detail with reference to the accompanying drawings. Wherever possible, the same reference numbers will be used throughout the drawings to refer to the same or like parts.

Figure 1:
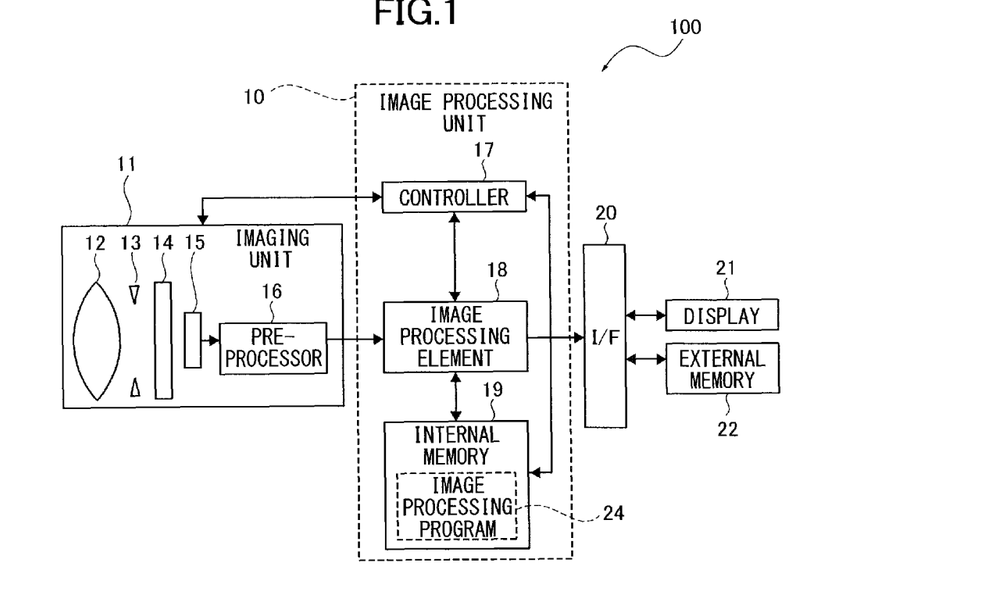
FIG. 1 is a block diagram of an imaging device comprising an image processing unit according to one embodiment of the present invention by way of example.

First, an imaging device comprising an image processing unit according to one embodiment of the present invention is described. FIG. 1 is a block diagram of the structure of a digital camera as an example of the imaging device. A digital camera 100 in FIG. 1 comprises an image processing unit 10, an imaging unit 11, an interface 20, a display 21, and an external memory 22. In the digital camera 100 the image processing unit 10 executes image processing on an image captured by the imaging unit 11, and the image is displayed on the display 21 via the interface 20 and stored in the external memory 22.

The imaging unit 11 comprises an imaging lens 12, a diaphragm 13, a mechanical shutter 14, an image sensor 15, and a pre-processor 16. The image sensor 15 is a photoelectric converter such as CMOS sensor or CCD sensor. The image of a subject is formed on the light receiving surface of the image sensor 15 via the imaging lens 12, diaphragm 13, and mechanical shutter 14, and photoelectrically converted to an image signal for output. The pre-processor 16 performs A/D conversion and gain control to the image signal output from the image sensor 15.

The image processing unit 10 comprises a controller 17, an image processing element 18, and an internal memory 19.

The controller 17 controls the input and output of the image signal from the imaging unit 11 and various kinds of image data stored in the internal memory 19 or external memory 22 for use in the image processing by the image processing element 18. It also controls the operations of the imaging lens 12 and mechanical shutter 14 of the imaging unit 11 as well as the input and output of various kinds of data to/from the internal memory 19.

The image processing element 18 generates image data with color and brightness equivalent to those the human eyes see from the image signal from the imaging unit 11, for instance. The internal memory 19 is made up of a semiconductor memory and contains image processing parameters and an image processing program 24 used for the execution of image processing.

After the image processing by the image processing unit 10, the image data is output to the display 21 or external memory 22 via the interface 20. The display 21 is a liquid crystal display or an organic EL display to display captured images. The external memory 22 is a nonvolatile memory such as flash memory and the image data stored therein are transferable to another imaging device or a computer.

The image processing unit 10 executes the image processing by the image processing program 24 stored in the internal memory 19 and the image processing element 18.

Figure 2:
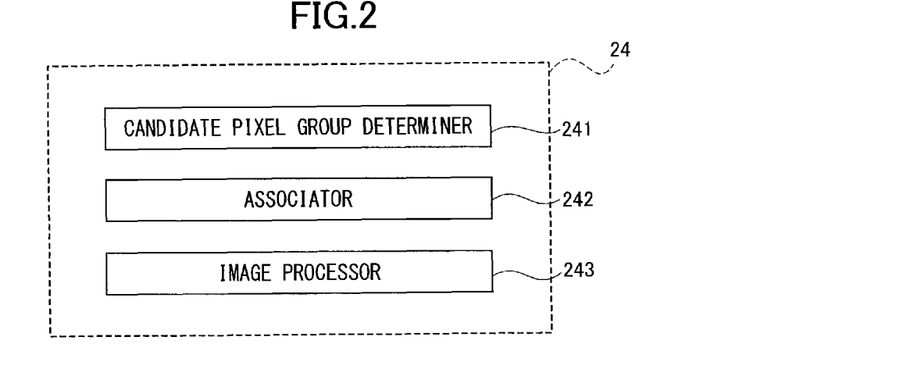
FIG. 2 is a function block diagram of the configuration of an image processing program of the image processing unit in FIG. 1 by way of example.

FIG. 2 is a function block diagram showing the configuration of the image processing program 24. It includes a candidate pixel group determiner 241, an associator 242 and an image processor 243.

The candidate pixel group determiner 241 comprises programs for executing a number of processing. An image to be processed is comprised of pixels. The candidate pixel group determiner 241 includes a program by which a pixel of interest is specified from the pixels of the image to be processed. Each pixel of the entire image or a set image area to be processed is specified as pixel of interest.

The candidate pixel group determiner 241 further includes a program for extracting pixels having a divergence in position within a certain range relative to the pixel of interest.

The candidate pixel group determiner 241 further includes a program for determining, from the extracted pixels, pixels having a divergence in pixel value within a certain range relative to the pixel of interest.

A group of pixels determined by the candidate pixel group determiner 241 is referred to as candidate pixel group to be processed (hereinafter, candidate pixel group).

The associator 242 includes a program by which the pixels of the candidate pixel group and the pixel of interest become associated with each other. Specifically, information for identifying each pixel of the candidate pixel group associated with information for identifying the pixel of interest are stored. The information for identifying each pixel refers to, for example, information on the position of each pixel of the image to be processed.

The candidate pixel group determiner 241 and associator 242 specify each pixel of the image to be processed as the pixel of interest and execute the above-mentioned processing for each pixel of interest at once.

The image processor 243 executes certain image processing such as filtering onto each pixel of interest. The image processor 243 comprises programs for the following processings, for instance.

The image processor 243 includes a program by which the candidate pixel group associated with the pixel of interest is read.

It further includes a program by which the pixels specified by the read candidate pixel group are selected as a pixel group to be processed.

It further includes a program by which the pixel value of the pixel of interest is smoothed in accordance with those of the selected pixel group to be processed.

It further includes a program by which the pixel value of the pixel of interest is substituted with the smoothed pixel value.

It further includes a program by which the number of times at which the image processor executes the image processing is controlled. By this program a series of processing of the image processor 243 are executed for each pixel of interest at plural times.

First Embodiment

Figure 3:
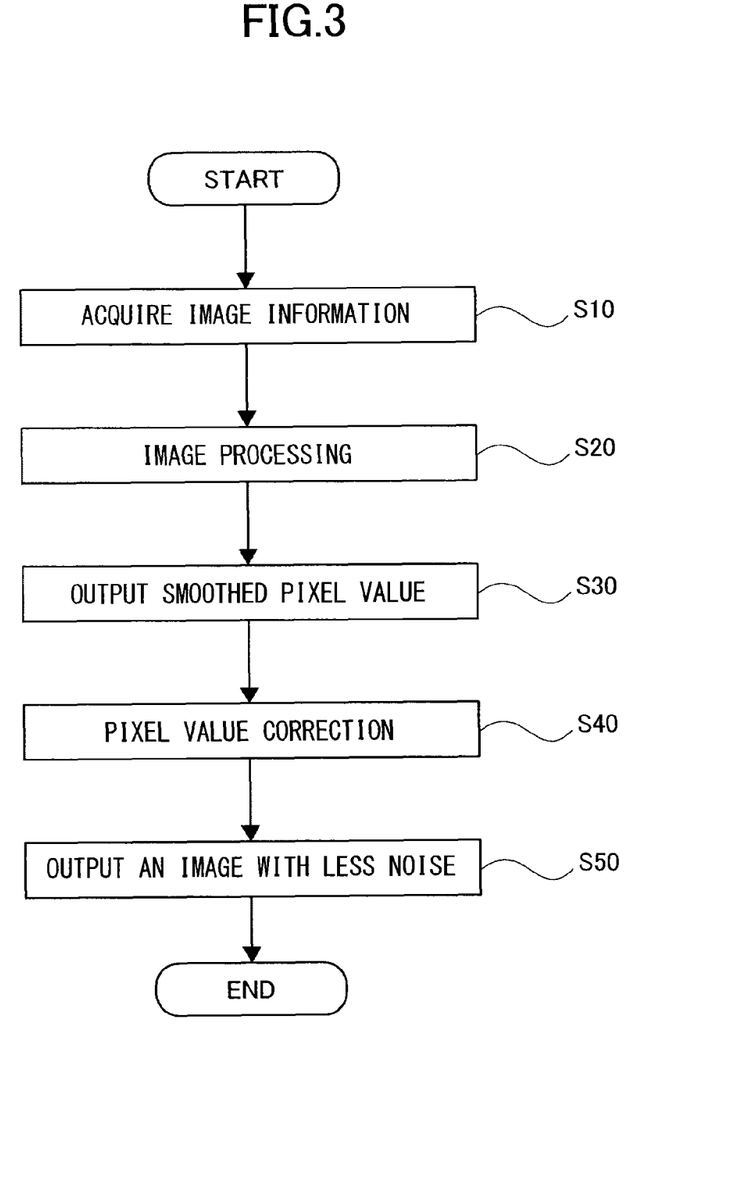
FIG. 3 is a flowchart for one example of an image processing method according to one embodiment.

Next, an image processing method according to a first embodiment of the present invention is described with reference to the flowchart in FIG. 3 by way of example. First, in step S10 image information is acquired. Specifically, an image to be processed is read into the internal memory 19 to determine an area as a subject of image processing. The image to be processed can be an image directly captured by the digital camera 100 or an image stored in the external memory 22.

In step S20 the image to be processed is subjected to image processing which will be described in detail later. By image processing a smoothed pixel value of each pixel of the image to be processed is generated. In step S30 the smoothed pixel value is output after completion of the image processing. In step S40 the pixel value of each pixel of the image to be processed is corrected in accordance with the smoothed pixel value. In step S50 an image with less noise reduced by the correction in step S40 is output.

Figure 4:
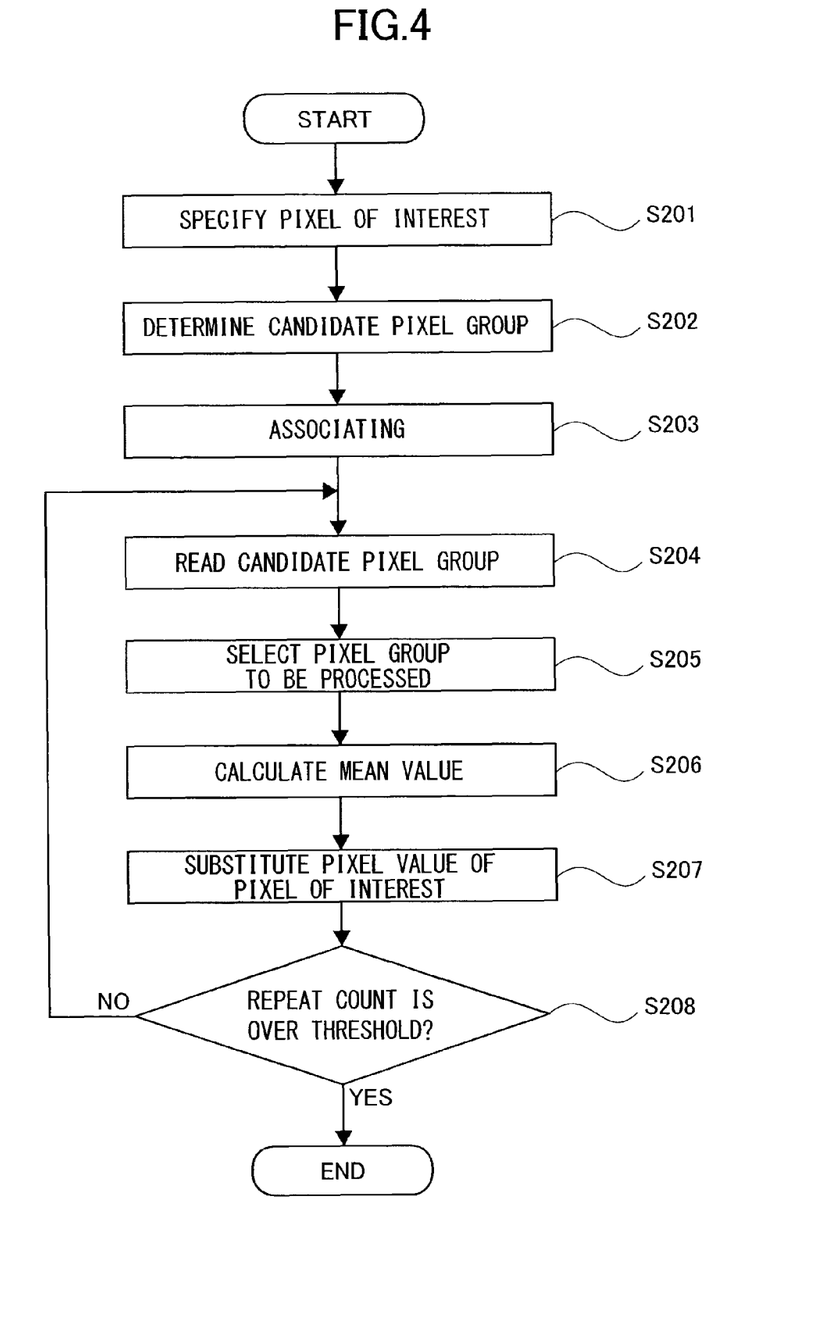
FIG. 4 is a flowchart for determining a candidate pixel group in the image processing method by way of example.

Next, one example of the image processing method according to the present embodiment is described with reference to FIG. 4. FIG. 4 is a flowchart for the details of the image processing in step S20. In step S201 a pixel of interest is specified from the pixels of the image to be processed.

In step S202 a candidate pixel group is determined. First, the pixels around each pixel of interest at position in a certain range, that is, the pixels having divergence in position in a certain range from the pixel of interest are extracted. Then, the pixels having pixel values in a certain range from that of each pixel of interest, that is, the pixels having a divergence in pixel value in a certain range are extracted from the extracted pixels. The extracted pixel group is a candidate pixel group.

Figure 5A:
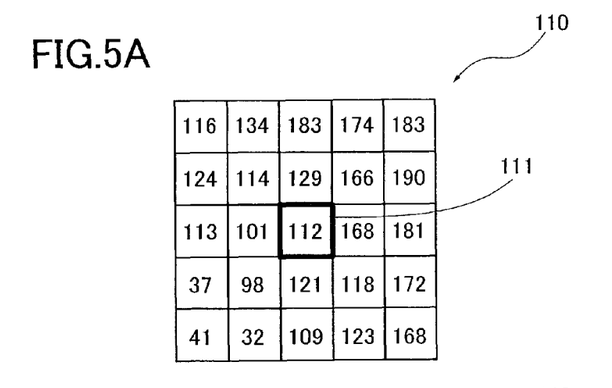
FIGS. 5A to 5C show an example of how a candidate pixel group is determined in the image processing method.
Figure 5B:
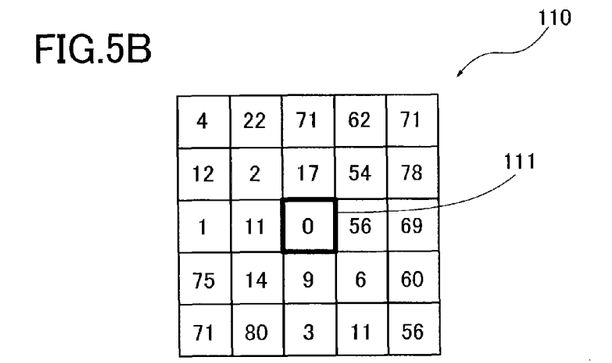
Figure 5C:
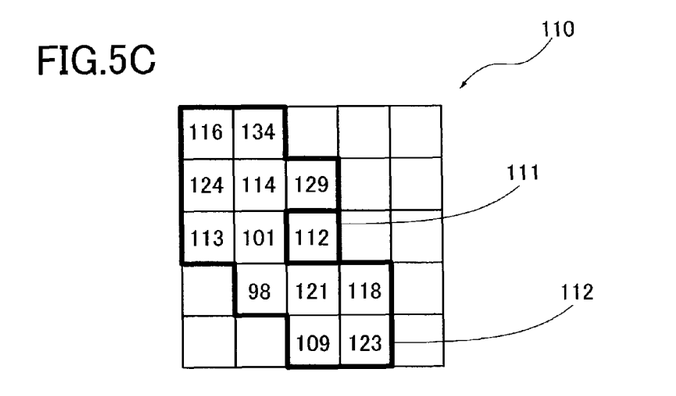

The candidate pixel group determination in step S202 is described referring to FIGS. 5A to 5C. FIGS. 5A to 5C show an example of the image to be processed subjected to the processing in the step S202. FIG. 5A shows a pixel group 110 with a divergence in position in a certain range from a pixel of interest 111. In the drawing each pixel is represented by a rectangle and the pixel group 110 includes 25 pixels (5 by 5).

The numerals in the rectangles indicate pixels values which are quantified information on each pixel. For example, the pixel values of a monochrome image will be represented in brightness values.

In FIG. 5A the pixel value of the pixel of interest 111 is 112. The divergence as the absolute value of a difference in the pixel values between each pixel of the pixel group 110 and the pixel of interest 111 is calculated as shown in FIG. 5B. Herein, the certain range of the divergence is set to 30 or less. FIG. 5C shows the extracted pixels within this range. A first pixel group 112 in FIG. 5C thus-extracted is determined as the candidate pixel group.

Returning to FIG. 4, in step S203 the first pixel group 112 gets associated with the pixel of interest 111. Specifically, information for identifying the position of each pixel of the first pixel group 112 associated with that for identifying the position of the pixel of interest 111 are stored in the internal memory 19, for example.

The processings in steps S202 and S203 are performed on each pixel of the image to be processed as pixel of interest 111 only at once. Thus, according to this image processing method the association between each pixel of interest 111 and the first pixel group 112 does not change by subsequent processing.

In step S204 the first pixel group 112 associated with the pixel of interest 111 to be processed is read from the internal memory 19.

In step S205 a pixel group to be processed is selected. Specifically, a second pixel group 113 having a divergence in pixel value from the pixel of interest 111 is selected from the pixels of the first pixel group 112 as the pixel group to be processed. When the pixel of interest 111 is subjected to this selection processing in step S205 for the first time, the pixels of the first pixel group 112 coincide with those of the second pixel group 113.

In step S206 the mean value of the pixel values of the second pixel group 113 is calculated.

In step S207 the pixel value of the pixel of interest 111 is substituted with the calculated mean value.

In step S208 the number of times at which the image processing is repeated (hereinafter, simply, repeat count) is determined. The threshold of the repeat count is predefined and stored in a not-shown memory. If the repeat count exceeds a certain threshold (Yes in step S208), the image processing is ended. If the repeat count does not exceed a certain threshold (No in step S208), the flow returns to step S204.

Now, the effects of the above image processing are described, referring to examples. FIGS. 6A to 6F show the relation between the first pixel group 112 and second pixel group 113. In the drawings the pixel group 110 consists of three pixels each in right and left directions from the pixel of interest 111 for the sake of simplicity.

Figure 6A:
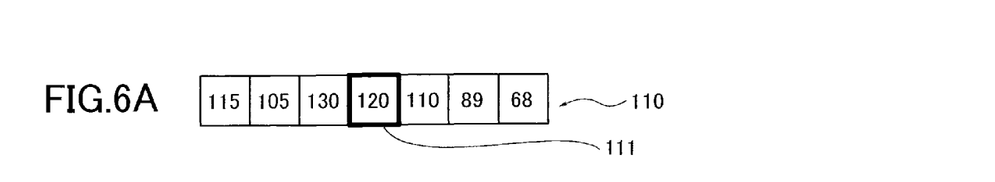
FIGS. 6A to 6F show a relation between a candidate pixel group and a pixel group to be processed.
Figure 6B:
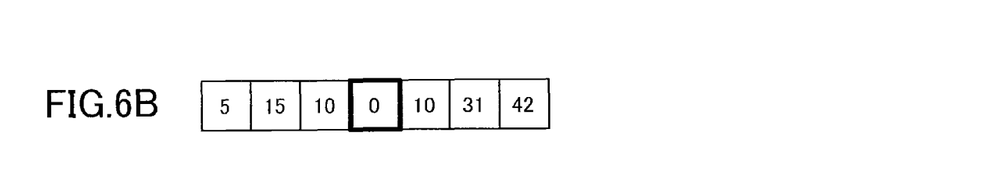
Figure 6C:
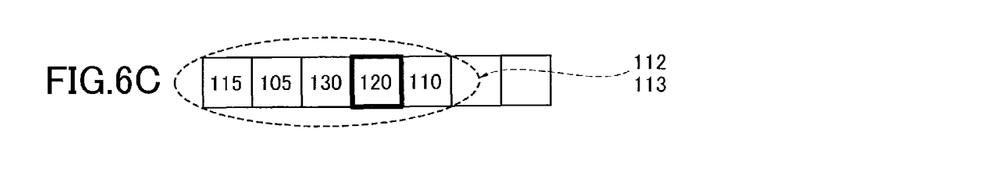

The pixel value of the pixel of interest 111 in FIG. 6A is 120. The absolute differences between the pixel of interest 111 and the pixels of the pixel group 110 are shown in FIG. 6B. Herein, the threshold of the divergence in the pixel value is set to 30 and pixels with the absolute difference of 30 or less are extracted, as shown in FIG. 6C. Thus-extracted pixels constitute the first pixel group 112.

The first pixel group 112 associated with the pixel of interest 111 is stored in the internal memory and read by the following processing.

In the initial image processing to the pixel of interest 111, the first pixel group 112 associated with the pixel of interest 111 are the ones shown in FIG. 6C. Then, pixels having the pixels values in the divergence of 30 or less from that of the pixel of interest 111 are determined to be the second pixel group 113 from the first pixel group 112. The determined second pixel group 113 is the same as the first pixel group 112. Thus, the mean value calculation in step S206 and the substitution in step S207 are executed based on the pixel values of the second pixel group 113 in FIG. 6C.

Figure 6D:
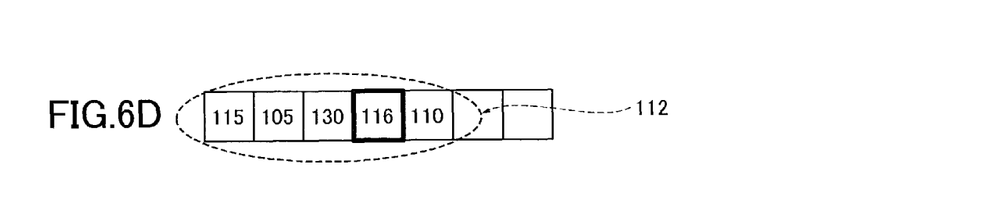

After the mean value calculation and substitution in steps S206 and S207, the pixel value of the pixel of interest 111 is 116. Then, the first pixel group 112 as shown in FIG. 6D is read in step S204.

Figure 6E:
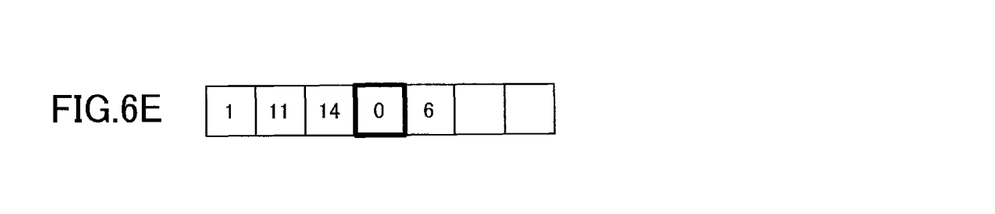
Figure 6F:
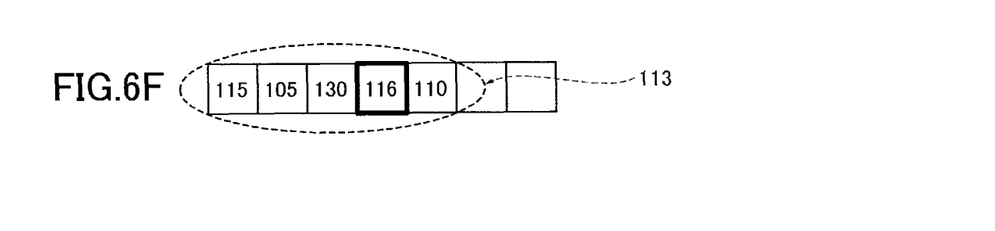

Next, the first pixel group 112 is subjected to the selection in step S205, and the absolute differences in the pixel values thereof are the values shown in FIG. 6E. The second pixel group 113 with pixel values within the certain range of divergence of 30 or less are shown in FIG. 6F. This processing is repeated until the repeat count reaches a predefined value.

An example where the above processing is repeated with no first pixel group 112 determined is described. In the pixel group 110 in FIG. 6A the value of the second pixel on the right from the pixel of interest 111 is 89. By the first substitution in step S207 the pixel value of the pixel of interest is changed to 116, so that in the second image processing the second pixel having the pixel value of 89 is included in the second pixel group 113 (|116−89|=27). Thus, upon repeating the image processing, the range of pixels included in the second pixel group 113 is expanded. That is, the edge portion of the image to be processed is expanded and blurred, degrading image quality.

Figure 7A:
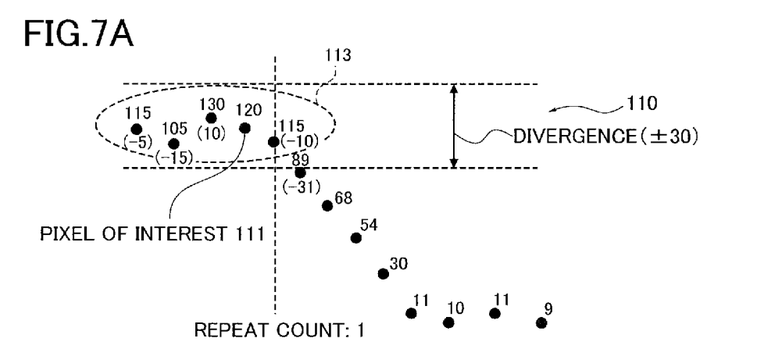
FIGS. 7A to 7C show the effects of the image processing method by way of example.
Figure 7B:
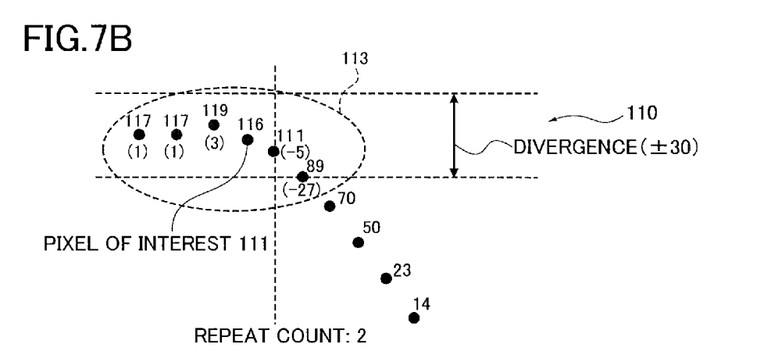
Figure 7C:
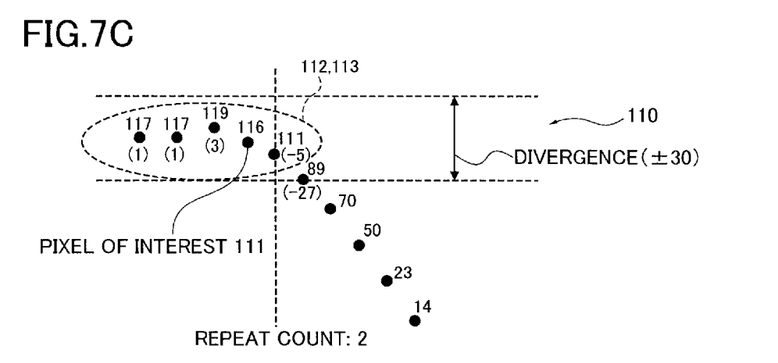

Now, the manner in which the edge portion is maintained even through the execution of image processing or filtering at plural times is described in detail. FIGS. 7A to 7C show the effects of the image processing method according to the present embodiment by way of example. In the drawings the pixels of the image to be processed are arranged in transverse direction while the magnitude of pixel values is indicated by the position in longitudinal direction. That is, an image with a sharp edge is obtained when a change in the position of each pixel in longitudinal direction is steep.

FIG. 7A shows the pixel group when the repeat count of prior art image processing and the image processing according to the present embodiment is 1. Similarly, FIGS. 7B and 7C show the same when the repeat count of the prior art image processing is 2 and when the repeat count of the image processing according to the present embodiment is 2, respectively.

In FIG. 7A the pixel value of the pixel of interest 111 is 120 when the repeat count is 1. Therefore, the second pixel group 113 includes five pixels including the pixel of interest 111 with the divergence in pixel value of 30 or less.

In prior art, at repeat count being 2 the number of pixels of the second pixel group 113 is increased as shown in FIG. 7B. That is, the edge portion is expanded. Thus, in prior art the edge portion becomes expanded and blurred along with the repetition of image processing.

Meanwhile, according to the image processing in the present embodiment, at the repeat count being 2 the number of pixels of the second pixel group 113 is not increased, as shown in FIG. 7C. The pixels having the same divergence in position as the initially determined first pixel group 112 constitute the second pixel group 113. Even if the image is further repeatedly subjected to the image processing, the pixel values in the neighborhood of the edge portion are prevented from approaching those of the edge portion and being included in the edge portion. Accordingly, the edge portion can be retained with a steep change.

According to the present embodiment the candidate pixel group determined by the initial image processing remains unchanged. Thus, it is possible to prevent the area of pixels as a subject of the image processing from expanding along with the repetitions of the substitution in step S207 to each pixel of interest 111. Even through the image processing at plural times, an image with a sharp edge and less noise can be generated.

Note that the divergence in pixel value used for selecting the second pixel group can be differently set according to the repeat count of image processing. For example, the divergence can be set to a smaller value as the repeat count increases. Thereby, it is possible to efficiently reduce noise in an image with a sharp edge portion retained even through repeated image processing.

With use of an imaging device incorporating the image processing unit according to the present embodiment, the repeat count can be changed in accordance with the ISO sensitivity of a captured image. Thereby, a more effective image processing can be executed to an image captured with a high sensitivity.

Second Embodiment

Figure 8:
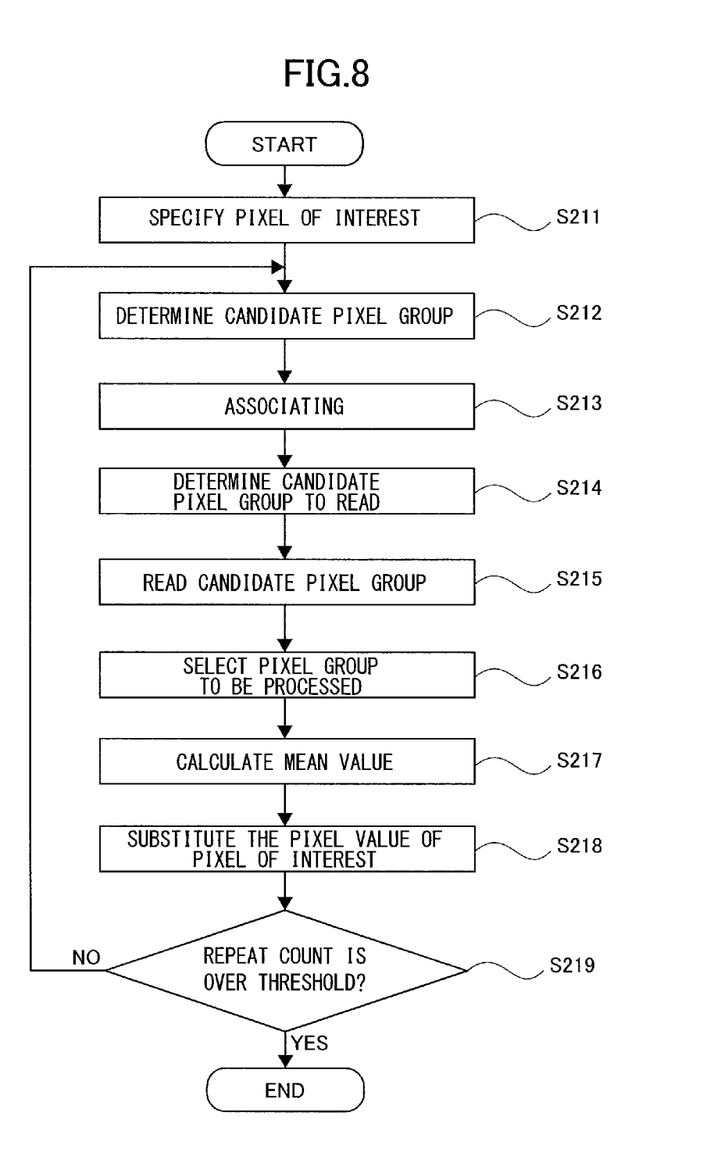
FIG. 8 is a flowchart for another example of the image processing method.

Next, another example of the image processing method is described. The differences from that in the first embodiment are mainly described. FIG. 8 is a flowchart for another example of the image processing in step S20 in FIG. 3.

First, in step S211 the pixel of interest 111 is specified from the pixels of the image to be processed.

In step S212 a candidate pixel group is specified. The pixels having a divergence in position in a certain range from the pixel of interest are extracted. Then, from the extracted pixels, the pixels having a divergence in pixel value from the pixel of interest in a certain range are extracted. Thus, the first pixel group 112 as a candidate pixel group is determined.

In step S213 the determined first pixel group 112 gets associated with the pixel of interest 111 and with the repeat count or the number of times at which image processing is repeated. For example, the information for identifying each pixel of the first pixel group 112, that for identifying the pixel of interest and the repeat count are associated with one another and stored in the internal memory 19.

Thereby, plural items of the information on the first pixel group 112 are stored in the internal memory in association with the pixel of interest 111 for each repeat count.

Then, in step S214 a determination is made on which of the first pixel groups 112 stored in the internal memory 19 in association with the specified pixel of interest is read in accordance with a repeat count.

In step S214 the repeat count can be determined in accordance with a predefined threshold for the expansion of edge. For instance, edge information is acquired from the image to be processed to determine whether or not the number of pixels corresponding to the expansion of edge is within a number a1. Then, the first pixel group 112 associated with the repeat count m is determined to be the one to read when the number of pixels in question is a1 or less. Further, when the number of pixels in question is a1 or more and a number b1 or less, the first pixel group 112 associated with the repeat count m−2 is read.

Alternatively, a threshold can be set to determine the repeat count. For example, the first pixel group 112 determined in the initial image processing is read until the repeat count reaches N, and at and after the repeat count N+1, the first pixel group 112 determined in the N-th image processing is read.

Then, in step S215 the first pixel group 112 associated with the determined repeat count is read.

In step S216 a pixel group to be processed is selected. In this step the pixels with a divergence in pixel value within a certain range from the pixel of interest 111 are specified as a pixel group to be processed or the second pixel group 113 from the pixels of the first pixel group 112.

In step S217 the mean value of the pixels values of the second pixel group 113 is calculated. In step S218 the pixel value of the pixel of interest 111 is then substituted with the calculated mean value.

Then, in step S219 a determination is made on how many times the image processing is repeated. The threshold of the repeat count is predefined. With the repeat count exceeding a certain threshold (Yes in step S219), the image processing is ended. With the repeat count not exceeding the threshold (No in step S219), the flow returns to the candidate pixel group determination in step S212.

According to the above-described image processing, generally, the removal of noise is given priority, and when the expansion of edges is beyond a certain amount, the edge expansion can be reduced. That is, it is possible to switch normal image processing over the one to remove noise with the edge expansion suppressed.

Further, according to the above-described image processing, generally, noise is removed from an image while edge retainment is given priority. After this processing is repeated over a certain number of times, isolated points may occur but can be removed using the N-th first pixel group 112.

Figure 9A:
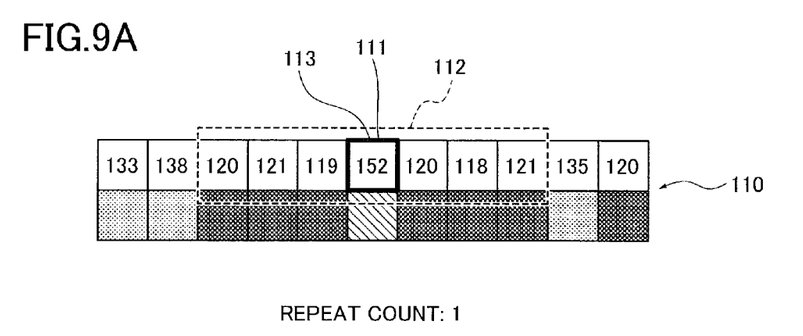
FIG. 9A to 9C show the effects of the image processing method in FIG. 8 by way of example.
Figure 9B:
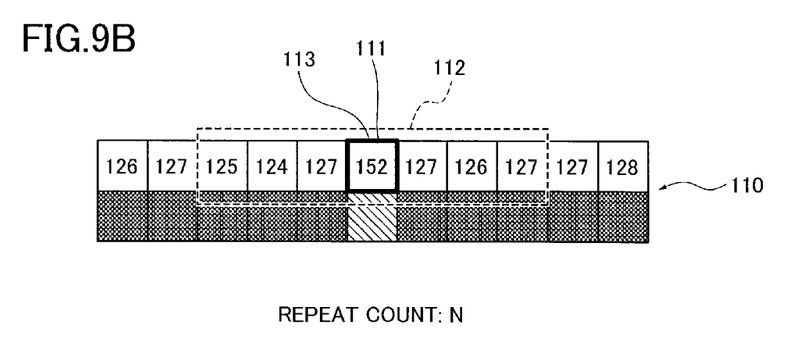
Figure 9C:
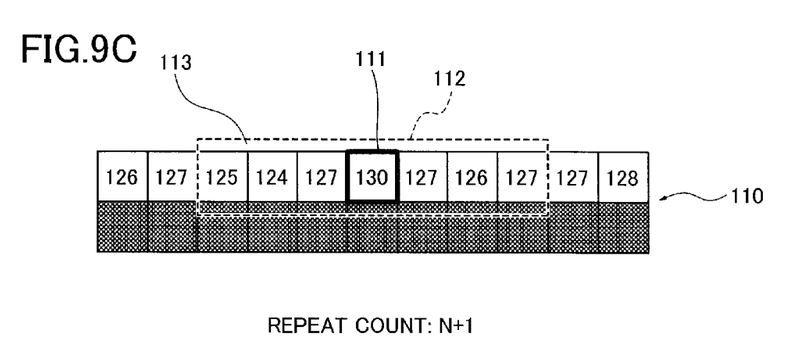

Next, an example of the effects of the image processing method according to the present embodiment is described, referring to FIGS. 9A to 9C. FIGS. 9A to 9C show the pixel group 110 when the repeat count is 1, N, and N+1, respectively.

FIGS. 9A to 9C show that the image processing is performed according to the initially determined first pixel group 112 until the repeat count reaches N and according to the N-th determined first pixel group 112 at and after the repeat count N+1.

The first pixel group 112 is the area surrounded by the broken line in FIG. 9A. In FIG. 9A the pixel value of the pixel of interest 111 is much larger than those of the other pixels of the first pixel group 112 since it includes a large noise. There are no pixels with absolute difference of 30 or less from the pixel value of 152 of the pixel of interest 111. Therefore, the second pixel group 113 comprises only the pixel of interest 111.

In this case the pixel value of the pixel of interest 111 remains unchanged even by smoothing with a calculated mean value. Meanwhile, the neighboring pixels of the pixel of interest 111 are smoothed by image processing. As shown in FIG. 9B, at the repeat count being N, the difference in the pixel values between the pixel of interest 111 and neighboring pixels is widened, and the pixel of interest 111 becomes isolated.

In view of the above, at and after the repeat count N+1 the image processing is performed based on the N-th first pixel group 112 in the present embodiment. Thereby, the pixel of interest 111 is smoothed to a value close to those of the neighboring pixels, as shown in FIG. 9C. Thus, the isolation of the pixel of interest 111 can be resolved.

According to the present embodiment the edge portion can be retained, using the first pixel group 112 at the repeat count being 1. Further, after the image processing is repeated at N+1 times or more, the N-th first pixel group 112 is always used to prevent the edge portion from blurring. Thereby, the edge portion can be retained constantly.

According to the image processing unit and image processing method in any of the above embodiments, it is able to reduce noises in an image by a plurality of filterings with an edge portion retained.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An image processing apparatus, comprising:

a candidate pixel group determiner specify that specifies each pixel of an image to be processed as a pixel of interest, extract pixels having a divergence in position in a certain range from the pixel of interest, and determine, from the extracted pixels, pixels having a divergence in pixel value in the certain range from the pixel of interest as a candidate pixel group;

an associator that associates the pixels of the candidate pixel group with the pixel of interest; and an image processor perform that performs image processing on the pixels of the candidate pixel group associated with the pixel of interest, selects pixels from the pixels of the candidate pixel group having a divergence in pixel value in the certain range from the pixel of interest as a pixel group to be processed, and smoothes a pixel value of the pixel of interest in accordance with the pixel value of each pixel of the candidate pixel group, wherein the image processor determines a number of times to repeat the image processing according to a predefined threshold, the determining of the candidate pixel group determiner is executed once for each pixel of interest, and the image processor executes the image processing for each pixel of interest the number of times.

2. The image processing apparatus according to claim 1, wherein the divergence in pixel value used for selecting the pixel group to be processed differs depending on the number of times at which the image processor performs the image processing.

3. The image processing apparatus according to claim 2, wherein the divergence in pixel value is inversely proportional to the number of times at which the image processor performs the image processing.

4. An imaging device, comprising:

an imaging apparatus to capture an image; and the image processing apparatus according to claim 1, the image processing apparatus performing the image processing on the image captured by the image apparatus.

5. The imaging device according to claim 4, wherein the number of times at which the image processor performs the image processing is proportional to an increase in an ISO sensitivity of the captured image.

6. An image processing apparatus, comprising:

a candidate pixel group determiner that specifies each pixel of an image to be processed as a pixel of interest, extract pixels having a divergence in position in a certain range from the pixel of interest, and determine, from the extracted pixels, pixels having a divergence in pixel value in the certain range from the pixel of interest as a candidate pixel group;

an associator that associates the pixels of the candidate pixel group with the pixel of interest; and an image processor that performs image processing on the pixels of the candidate pixel group associated with the pixel of interest, selects pixels from the pixels of the candidate pixel group having a divergence in pixel value in the certain range from the pixel of interest as a pixel group to be processed, and smoothes a pixel value of the pixel of interest in accordance with the pixel value of each pixel of the candidate pixel group, wherein the image processor determines a number of times at which the image processing is repeated for each pixel of interest in accordance with an expanse of an edge of the image to be processed, specifies a candidate pixel group associated with the determined number of times, selects the pixel group to be processed according to the specified candidate pixel group, and performs the image processing the number of times for each pixel of interest.

7. An image processing method, comprising:

specifying each pixel of an image to be processed as a pixel of interest, extracting pixels having a divergence in position in a certain range from the pixel of interest, and determining, from the extracted pixels, pixels having a divergence in pixel value in a certain range from the pixel of interest as a candidate pixel group;

associating the pixels of the candidate pixel group with the pixel of interest; and performing, by an image processor, image processing on the pixels of the candidate pixel group associated with the pixel of interest;

selecting pixels, by the image processor, from the pixels of the candidate pixel group having a divergence in pixel value in a certain range from the pixel of interest as a pixel group to be processed; and smoothing, by the image processor, a pixel value of the pixel of interest in accordance with the pixel value of each pixel of the candidate pixel group, wherein the image processor determines a number of times to repeat the image processing according to a predefined threshold, the determining of the candidate pixel group is executed once for each pixel of interest, and the image processing is executed, by the image processor, for each pixel of interest at-the number of times.

8. The image processing method according to claim 7, wherein the divergence in pixel value used for selecting the pixel group to be processed differs depending on the number of times at which the image processing is performed by the image processor.

* * * * *